United States Patent
Nakamura et al.

(10) Patent No.: US 9,522,606 B2
(45) Date of Patent: Dec. 20, 2016

(54) BOOST-BUCK CONVERTER CONTROL SYSTEM

(71) Applicant: DENSO CORPORATION, Kariya, Aichi-pref. (JP)

(72) Inventors: Makoto Nakamura, Okazaki (JP); Masashi Funada, Obu (JP); Akiyoshi Morii, Obu (JP)

(73) Assignee: DENSO CORPORATION, Kariya (JP)

( * ) Notice: Subject to any disclaimer, the term of this patent is extended or adjusted under 35 U.S.C. 154(b) by 455 days.

(21) Appl. No.: 14/221,790

(22) Filed: Mar. 21, 2014

(65) Prior Publication Data

US 2014/0292076 A1    Oct. 2, 2014

(30) Foreign Application Priority Data

Mar. 28, 2013 (JP) .................. 2013-70622

(51) Int. Cl.
*B60L 11/18* (2006.01)
*B60L 7/16* (2006.01)
*H02M 3/156* (2006.01)
*H02M 3/158* (2006.01)

(52) U.S. Cl.
CPC .............. *B60L 11/1851* (2013.01); *B60L 7/16* (2013.01); *H02M 3/156* (2013.01); *H02M 3/1582* (2013.01); *B60L 2210/12* (2013.01); *B60L 2210/14* (2013.01); *Y02T 10/7005* (2013.01); *Y02T 10/705* (2013.01); *Y02T 10/7225* (2013.01); *Y02T 10/7233* (2013.01)

(58) Field of Classification Search
CPC ..... B60L 11/1851; B60L 7/16; B60L 2210/12; B60L 2210/14; H02M 3/156; H02M 3/1582; Y02T 10/7005; Y02T 10/705; Y02T 10/7233; Y02T 10/7225
See application file for complete search history.

(56) References Cited

U.S. PATENT DOCUMENTS

| | | | |
|---|---|---|---|
| 8,008,899 B2* | 8/2011 | Heim ................... | H02M 3/1582 323/222 |
| 8,169,199 B2* | 5/2012 | Okamura ............ | H02M 3/1588 323/222 |
| 2006/0114702 A1* | 6/2006 | Yamada ................. | H02M 1/38 363/132 |

FOREIGN PATENT DOCUMENTS

| | | |
|---|---|---|
| JP | 2004-120844 | 4/2004 |
| JP | 2006-311635 | 11/2006 |
| JP | 2009-148119 | 7/2009 |
| JP | 2011-55676 | 3/2011 |

* cited by examiner

*Primary Examiner* — Zeev V Kitov
(74) *Attorney, Agent, or Firm* — Nixon & Vanderhye P.C.

(57) ABSTRACT

A control system includes a boost-buck converter, a control apparatus and a voltage sensor. The boost-buck converter is provided between a battery and a motor-generator. The control apparatus controls the boost-buck converter. The voltage sensor outputs a sensor output value of a system voltage supplied to the motor. The control apparatus calculates a current stagnation continuation period based on the sensor output value of the voltage sensor and corrects a duty ratio of the boost-buck converter in accordance with a calculation value of the continuation period. The continuation period includes a predetermined time point, at which current stagnation is assumed to be generated. The current stagnation indicates that at least a reactor current stagnates. In the continuation period, a system voltage-related voltage continues to have a voltage difference of the same polarity side relative to a reference voltage.

6 Claims, 12 Drawing Sheets

FIG. 3 COMPARISON EXAMPLE

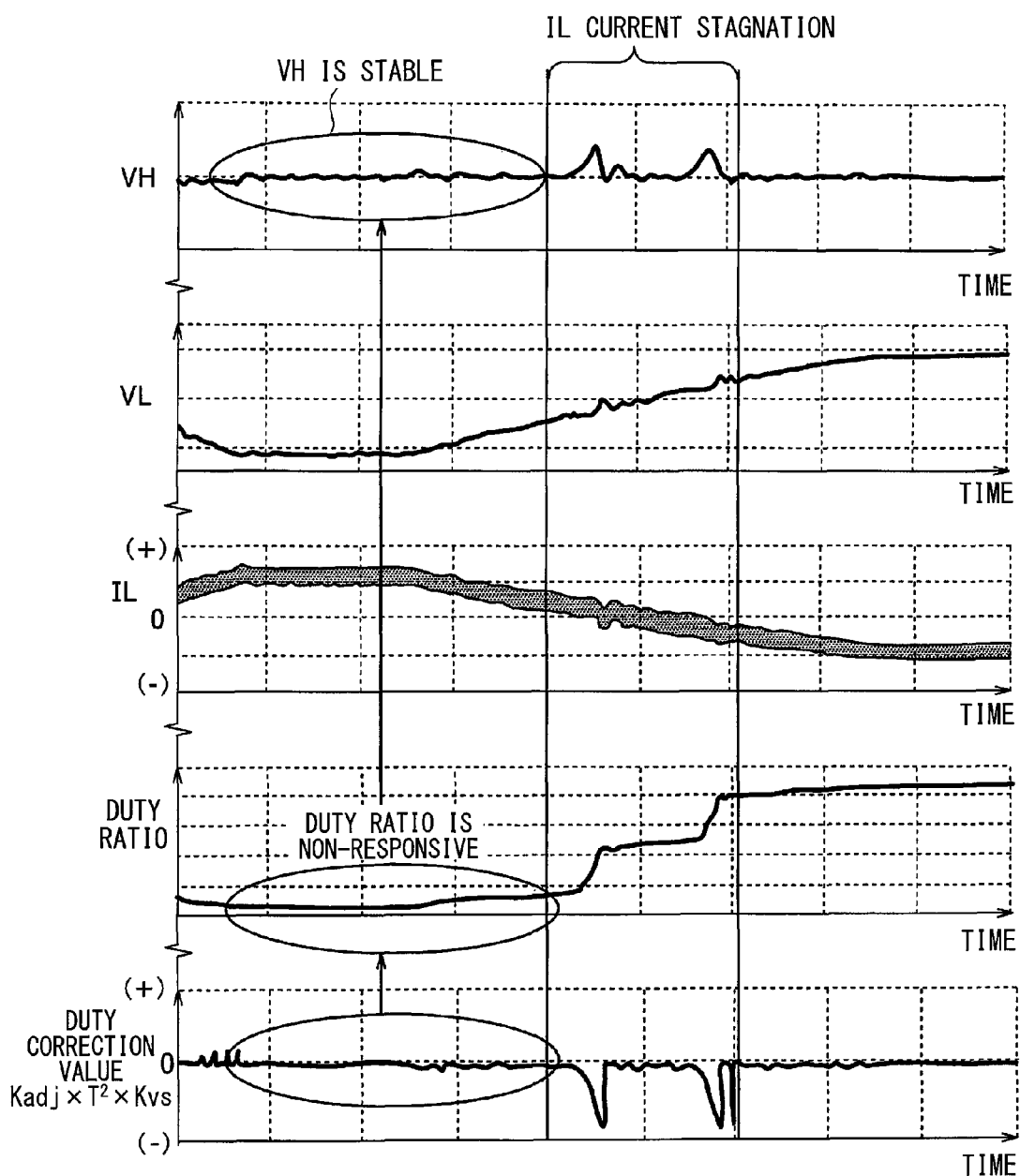

BOOST-BUCK CONVERTER CONTROL SYSTEM

CROSS REFERENCE TO RELATED APPLICATION

This application relates to and incorporates herein by reference Japanese patent application No. 2013-70622 filed on Mar. 28, 2013.

FIELD

The present disclosure relates to a boost-buck converter control system for a boost-buck converter, which is provided between a battery and a load to step up and down a voltage between a battery voltage and a system voltage of the load.

BACKGROUND

It is known in a conventional boost-buck converter control system that current stagnation, in which a reactor current stagnates or stays around zero (0) volt, occurs when a flow direction of current flowing between a battery and a voltage converter is switched over in a state that a voltage of the battery is stepped up to be supplied to a load as a system voltage in a vehicle. The switchover of the flow direction of current is caused when a load state is switched over between power running and regenerative running of the vehicle.

The following patent documents 1 to 4 disclose conventional boost-buck converter control systems.

[Patent document 1] JP-A-2011-55676
[Patent document 2] JP-A-2004-120844
[Patent document 3] JP-A-2009-148119
[Patent document 4] JP-A-2006-311635

Patent document 1 discloses suppression of variation of a system voltage when current stagnation occurs in a boost-buck converter control system. When a switchover of polarity of a power supply current is estimated by calculating the power supply current based on an accelerator position of a vehicle, electric power of a motor and a battery voltage, a power supply duty ratio is corrected by a value, which corresponds to a predetermined dead time.

Patent document 2 discloses outputting of a correction value for suppressing variation of a system voltage from a correction circuit based on a determination result of a current flow path of a boost-buck converter in a boost-buck converter control system. The current flow path of the boost-buck converter is determined based on a comparison of an inverter output power, which is calculated by an arithmetic calculation circuit, with a predetermined value by a comparator.

Patent document 3 discloses setting of a PWM voltage command value to zero when an absolute value of a difference between a target voltage and a DC bus voltage developed between a boost-buck converter and a load is equal to or larger than a predetermined voltage and a current value of power supplied by the boost-buck converter is equal to or less than a predetermined value. The PWM voltage command value is set to zero by replacing an integration component value included in a duty ratio of the boost-buck converter is substituted with a reciprocal of a proportional component.

Patent document 4 discloses feedback-controlling an output voltage, which is calculated based on a reactor current detected by a current sensor in a boost-buck converter control system, when high response characteristic is needed at the time of rapid changes in a motor power load or a command voltage.

According to patent document 1, the current stagnation is estimated by comparing a detection value of a sensor with a predetermined value and the duty ratio of the boost-buck converter is corrected by a predetermined correction value in accordance with the detection value of the sensor. It is not possible, however, to correct the duty ratio with an appropriate correction value because of manufacturing error of the sensor or variation in a dead time corresponding to manufacturing error of switching elements of a voltage converter. If the correction value is excessively small, the current stagnation will continue and rapid variation of the system voltage will not be suppressed sufficiently. If the correction value is excessively large, the current will vary rapidly and the battery voltage will rapidly vary. That is, it is not possible to control the current smoothly. According to patent documents 2 and 3, the current stagnation cannot be detected accurately either and hence the duty ratios cannot be corrected appropriately. According to patent documents 3 and 4, current sensors are needed additionally.

SUMMARY

It is therefore an object to provide a boost-buck converter control system, which can suppress rapid variation of a system voltage at the time of current stagnation as well as rapid variation of a battery voltage by appropriately controlling a current without addition of a current sensor for detecting a reactor current.

According to one aspect, a boost-buck converter control system comprises a boost-buck converter, a control apparatus and a voltage sensor. The boost-buck converter is provided between a charge storage device and a load and including a plurality of switching elements and a reactor. The boost-buck converter boosts or bucks a voltage between a voltage of the charge storing device and a system voltage supplied to the load. The control apparatus controls an operation of the boost-buck converter. The voltage sensor outputs a sensor output value indicative of the system voltage. The control apparatus calculates a continuation period, in which a voltage difference relative to a reference voltage corresponding to a voltage command of the system voltage continues to be in a same polarity side in a system voltage-related voltage, and corrects a duty ratio of the boost-buck converter in accordance with a calculation value of the continuation period. The continuation period includes a predetermined time, in which generation of current stagnation is determined based on the sensor output value of the system voltage. The current stagnation indicates stagnation of a reactor current at immediately before or after a switchover between a boost operation and a buck operation of the boost-buck converter.

BRIEF DESCRIPTION OF THE DRAWINGS

FIG. 15 is a time chart showing a result of experiment conducted in the third embodiment in the similar manner as FIG. 14.

EMBODIMENT

Figure 1:
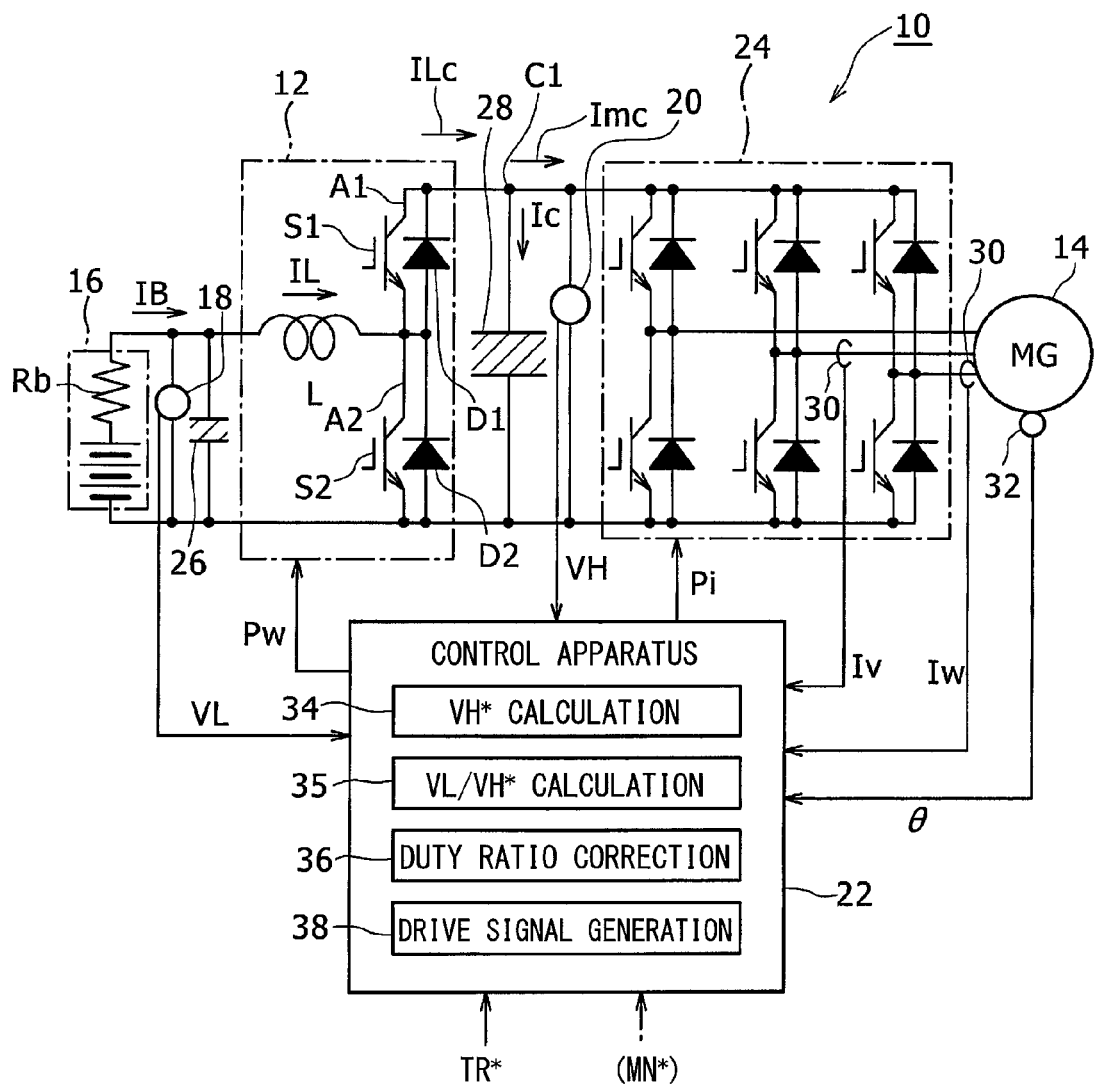
FIG. 1 is a circuit diagram of a boost-buck converter control system according to a first embodiment.

A boost-buck control system will be described below with reference to plural embodiments shown in the drawings. In the following description, same parts are designated with same reference numerals to simplify the description.

First Embodiment

Referring to FIG. 1 showing a first embodiment, a boost-buck converter control system 10 has a function of a vehicular motor (rotary electric machine) control system. The control system 10 includes a motor-generator 14, which is a motor, a boost-buck converter 12, a battery 16, which is an electricity storage device, voltage sensors 18, 20 and a control apparatus 22. The control system 10 is provided also with an engine in addition to the motor-generator 14 and mounted on a hybrid vehicle, which travels by using at least one of the engine and the motor-generator 14 as a drive power source. The control system 10 may be used in an electric vehicle or a fuel-cell vehicle, which uses the motor-generator 14 as the drive power source, in place of the hybrid vehicle. The control system 10 may be configured to control plural motor-generators.

The motor-generator 14 is driven with electric power supplied mainly from the battery 16. The motor-generator 14 is a three-phase synchronous motor, which is a load for generating drive power for a vehicle. The motor-generator 14 is referred to as MG 14 below.

The MG 14 is also used as a generator, which generates electric power when driven by the engine and regenerates electric power when driven for regenerative braking at vehicle deceleration. The power generated by the MG 14 is converted from a three-phase AC voltage to a DC voltage by an inverter 24 and supplied to the battery 16 through the boost-buck converter 12 so that the battery 16 is charged. The MG 14 may be an induction motor or other electric motors. The MG 14 may be an electric machine, which has a primary function of a generator driven by an engine and has a secondary function of an electric motor driven with electric power supplied from the battery 16.

The boost-buck converter 12 is a DC/DC converter, which has a positive-side (high-side) arm A1, a negative-side (low-side) arm A2 and a reactor L, which is a coil having one end connected to an intermediate point between the high-side arm A1 and the low-side arm A2. The high-side arm A1 includes a high-side switching element S1 and a diode D1. The low-side arm A2 includes a low-side switching element S2 and a diode D2. The high-side switching element S1 and the low-side switching element S2 are connected in series with each other. The diode D1 is connected in parallel to allow a reverse current to flow relative to the high-side switching element S1. That is, the diode D1 is reverse-biased. The diode D2 is connected in parallel to allow a reverse current to flow relative to the low-side switching element S2. That is, the diode D2 is also reverse-biased. The switching elements S1 and S2 may be transistors such as IGBTs. The boost-buck converter 12 steps up the DC voltage supplied from the battery 16 and outputs the stepped-up voltage to the inverter 24 as a system voltage VH. The boost-buck converter 12 steps down the DC voltage inputted from the inverter 24 and outputs the stepped-down voltage to the battery 16.

The inverter 24 converts the DC voltage inputted from the boost-buck converter 12 into a three-phase AC voltage and supplies it to the MG 14 to drive the MG 14 for vehicle travel. The inverter 24 converts also the AC voltage generated by the MG 14 at the time of regenerative braking of a vehicle to the DC voltage and supplies the DC voltage to the boost-buck converter 12 for charging the battery 16.

The battery 16 is formed of a secondary battery such as a nickel metal hydride battery or a lithium-ion battery. This electricity storage device may be formed of a capacitor. The battery 16 has an internal resistance Rb. A low voltage-side capacitor 26 is connected between a point, which is between the positive-side of the battery 16 and the other end of the reactor L, and a point, which is between the negative-side of the battery 16 and the negative-side of the low-side switching element S2. A high voltage-side capacitor 28 is connected between the boost-buck converter 12 and the inverter 24.

The voltage sensor 18 detects the battery voltage VL developed between both ends of the battery 16 and outputs a sensor output value as the sensor voltage VL to the control apparatus 22. A voltage sensor 20 detects the system voltage VH and outputs a sensor output value as the sensor voltage VH to the control apparatus 22. The voltage sensor 20 may acquire information of a VH waveform, which shows a relative variation of the system voltage to time and output the information of the VH waveform to the control apparatus 22. The control apparatus 22 is an electronic control unit (ECU), which includes a microcomputer having a CPU, memories and the like. The control apparatus 22 is exemplarily shown as one control apparatus. However, the control apparatus 22 may be divided into plural functional units, which are connected one another via signal cables.

A torque command value TR* is inputted to the control apparatus 22. The torque command value TR* is generated by another control apparatus, which is not shown, in accordance with a sensor output value of an accelerator sensor, which detects an operation amount of an accelerator pedal of a vehicle. Sensor output values of current sensors 30 are also inputted to the control apparatus 22. These sensor output values indicate stator currents Iv and Iw, which flow in stator coils of two phases (for example, V-phase and W-phase) of the MG 14. A sensor output value of a rotation angle sensor 32 is inputted to the control apparatus 22. This sensor output value indicates a rotation angle θ of a rotor of the MG 14.

The control apparatus 22 generates a drive signal Pi for switching control and outputs it to the inverter 24 so that the MG 14 generates torque in accordance with the torque command value TR*. The drive signal Pi is determined based on the torque command value TR*, the stator currents Iv, Iw and the rotation angle θ. In a case that a rotation speed command value MN* indicating a number of rotations per unit time of the MG 14 is inputted to the control apparatus 22 from the other control apparatus, a drive signal may alternatively be outputted to the inverter 24 so that the torque is generated in accordance with the torque command value TR* and the rotation speed command value MN*.

The control apparatus 22 includes a VH* calculation part 34, a VL/VH* calculation part 35, a duty ratio correction part 36 and a drive signal generation part 38. These parts 34 to 38 may be provided by software, hardware or a combination of software and hardware. The VH* calculation part 34 calculates a voltage command value VH* of the system voltage VH, which is the output voltage of the boost-buck converter 12. The voltage command value VH* is calculated based on the torque command value TR* by using a predetermined arithmetic relational equation or a map data stored in the memory. The VH* calculation part 34 may alternatively calculate the voltage command value VH* based on the torque command value TR* and the rotation speed command value MN* by using a predetermined arithmetic relational equation or a map data stored in the memory. That is, the control apparatus 22 calculates VH* most appropriate for a drive state of the MG 14. The control apparatus 22 feedback-controls the boost-buck converter 12 by proportional-and-integral (PI) control so that the sensor output value VH of the voltage sensor 20 follows the voltage command value VH*.

Figure 2:
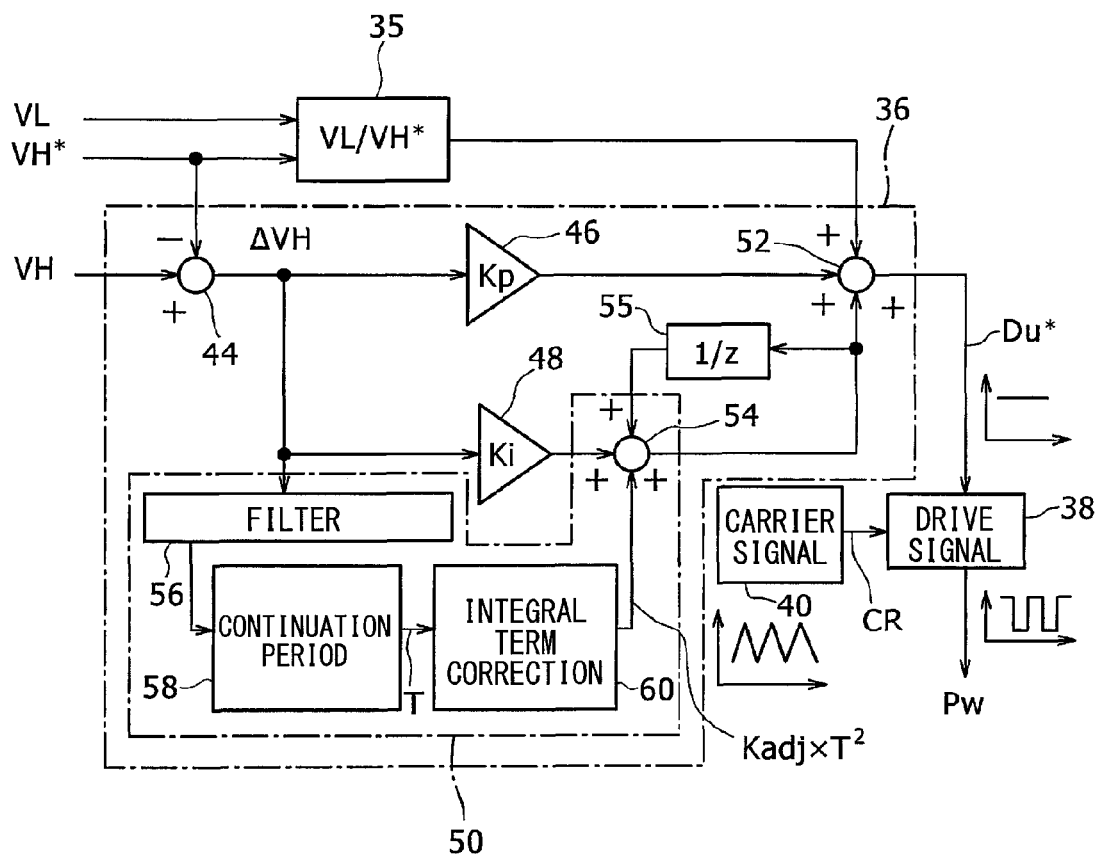
FIG. 2 is a block diagram of a circuit configuration, which outputs a drive signal Pw in accordance with a command voltage VH* in the boost-buck control system shown in FIG. 1.

The drive signal generation part 38 generates the drive signal as a PWM signal by comparing a threshold value signal and a carrier signal CR. The threshold value signal is determined based on a duty ratio Du*, which is generated and outputted by the duty ratio correction part 36 based on a calculation value of the voltage command value VH*. The carrier signal CR is generated and outputted by a carrier signal generation part 40, which is shown in FIG. 2 described below. The drive signal Pw is outputted to the switching elements S1 and S2 of the boost-buck converter 12. The switching elements S1 and S2 are controlled to switch to an on-state or an off-state in accordance with the drive signal Pw. The VL/VH* calculation part 35 and the duty ratio correction part 36 will be described below.

FIG. 2 shows a configuration for outputting the drive signal Pw in accordance with the voltage command value VH* of the system voltage in the control apparatus 22. The sensor output value of the battery voltage VL and the voltage command value VH* are inputted to the VL/VH* calculation part 35. The VL/VH* calculation part 35 calculates a value VL/VH* and outputs it to an adder 52.

The duty ratio correction part 36 includes a subtractor 44, a proportional multiplier 46, an integral multiplier 48, an integral term correction part 50 and an adder 52. The voltage command value VH* and the sensor output value of the system voltage VH are inputted to the subtractor 44. The subtractor 44 subtracts the voltage command value VH* from the sensor output value of the system voltage VH to calculate a voltage difference $\Delta VH$ (=VH−VH*). The calculation value of the voltage difference $\Delta VH$ is outputted to the integral multiplier 48 and the integral term correction part 50. In consideration of sensor error of the voltage sensor 20, the voltage command value VH* of the system voltage acquired by the voltage sensor 20 may be assumed to be an average value per predetermined time of the VH waveform under the same torque command time in a period, in which normal PI control is performed with no current stagnation of the reactor L.

The proportional multiplier 46 multiplies the calculation value of the voltage difference $\Delta VH$ by a predetermined proportional gain Kp and outputs the calculation value of multiplication to the adder 52 as a proportional term of the PI control. The integral multiplier 48 multiplies the calculation value of the voltage difference $\Delta VH$ by a predetermined integral gain Ki and outputs the calculation value of multiplication to an adder 54 of the integral term correction part 50 as a basic integral term.

The adder 54 adds the integral term correction value, which is calculated in a present control cycle and outputted from an integral term correction value calculation part 60 described below, and a previous calculation value, which is calculated one control cycle before and outputted from a one-shift delay circuit 55, and outputs the calculation value of addition to the adder 52. The adder 52 adds the calculation values of the proportional multiplier 46 and the calculation value of the adder 54 to the calculation value VL/VH*. The adder 52 generates the calculation value of this addition as the duty ratio Du* and outputs it to the drive signal generation part 38. The integral multiplier 48, the integral term correction part 50 and the one-shift delay circuit 55 form an integral term calculation part in the PI control.

The integral term correction part 50 performs low-pass filtering processing, which is smoothing processing, on a waveform of time-variation of the voltage difference $\Delta VH$. The integral term correction part 50 then calculates a continuation period (duration of continuation) T, in which the voltage difference of the same polarity-side, that is, positive-side, continues, in the waveform of the filter-processed voltage difference $\Delta VHLPF$.

The control apparatus 22 corrects the duty ratio of the boost-buck converter 12, which is determined by using the calculation value of the VL/VH* calculation part 35, by using the calculation value of the continuation period T in each control cycle. Calculation of the integral term correction value in the integral term correction part 50 and its detailed configuration will be described next.

Figure 3:
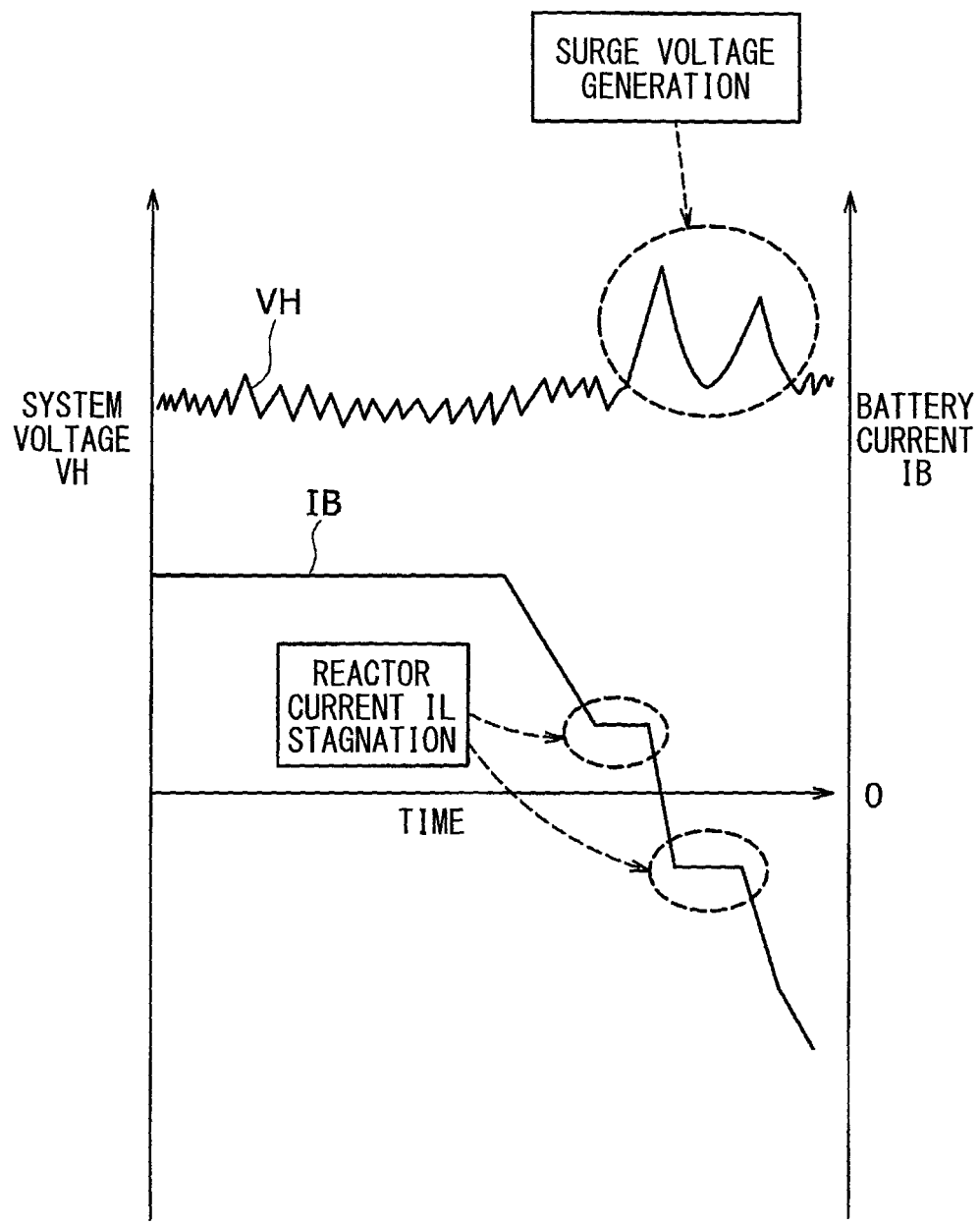
FIG. 3 is a time chart showing a result of experiment of time variations of a system voltage VH and a battery current IB in a comparison example.

FIG. 3 shows results of experiment of time variations of a system voltage VH and a battery current IB in a control system for a boost converter according to a comparison example. A control apparatus in the comparison example is different from the control apparatus 22 of the first embodiment in that the integral term correction part 50 is not provided. In the comparison example, other parts are the same as those shown in FIG. 1 and FIG. 2.

In the comparison example, when the MG 14 changes from the power running operation to the regeneration operation, the reactor current IL changes from positive to negative assuming that a current value of a reactor current IL flowing in the reactor L from the battery 16 to the inverter 24 is positive. In this case, when the boost-buck converter 12 performs a voltage boosting or bucking operation, the high-side switching element S1 and the low-side switching element S2 repeat switching on and off alternately so that the on-timing and the off-timing become opposite between the high-side switching element S1 and the low-side switching element S2. When the on-off of the high-side switching element S1 and the low-side switching element S2 are switched over, a dead time arises when both of the switching elements S1 and S2 are switched to the off-state. When the dead time arises immediately before or immediately after the switching between the boosting operation and the bucking operation of the boost-buck converter 12, the reactor current IL does not flow substantially in the dead time thus causing the current stagnation, in which the reactor current IL stagnates at around zero (IL=0). This current stagnation is also referred to as an ILO clamp. This current stagnation is caused because the reactor current IL becomes smaller than a value corresponding to a resistance of the diode D1 or the high-side switching element S1.

The battery current IB generally coincides with an average of the reactor current IL, which includes ripple components. The battery voltage IB also stagnates at around zero similarly to the reactor current IL. Because of this current stagnation, the system voltage VH generates surge voltages, which are sharp changes in voltage. This generation of surge voltage causes excessive voltages to circuit components connected to the boost-buck converter 12 and degrades durability of the circuit components. It is thus needed to suppress surge voltage generation.

This surge voltage increases variation of the voltage difference ΔVH between the sensor output value VH of the system voltage and the voltage command value VH*. When the MG 14 changes its operation mode from the power running operation to the regeneration operation, the voltage difference ΔVH increases in the positive direction while fluctuating in a wavy form. According to the first embodiment, for this reason, the duty ratio Du* is corrected by adding a large correction value to the integral term of the PI control in each control cycle of calculating the duty ratio Du* of the boost-buck converter 12 so that the positive-side difference of the filter-processed voltage difference ΔVH is decreased in a case that the difference of the waveform of the filter-processed voltage difference ΔVH, which is the VH-related voltage, continues in the same polarity side, that is, the positive-side. The integral term is corrected by the integral term correction part 50.

It is understood that the magnitude of the voltage difference ΔVH is determined by the continuation period of variation in changing to the positive side.

This will be described next. In FIG. 1, the following equation (1) holds, assuming that ILc, Ic and Imc are a high-side arm current flowing in the high-side arm A1 as the output-side current of the boost-buck converter 12, a capacitor current flowing into the high voltage-side capacitor 28 and a motor consumption current flowing out to the inverter 24 from a positive-side junction point C1 between the high voltage-side capacitor 28 and boost-buck converter 12.

$$Ic = ILc - Imc \quad (1)$$

Figure 4:
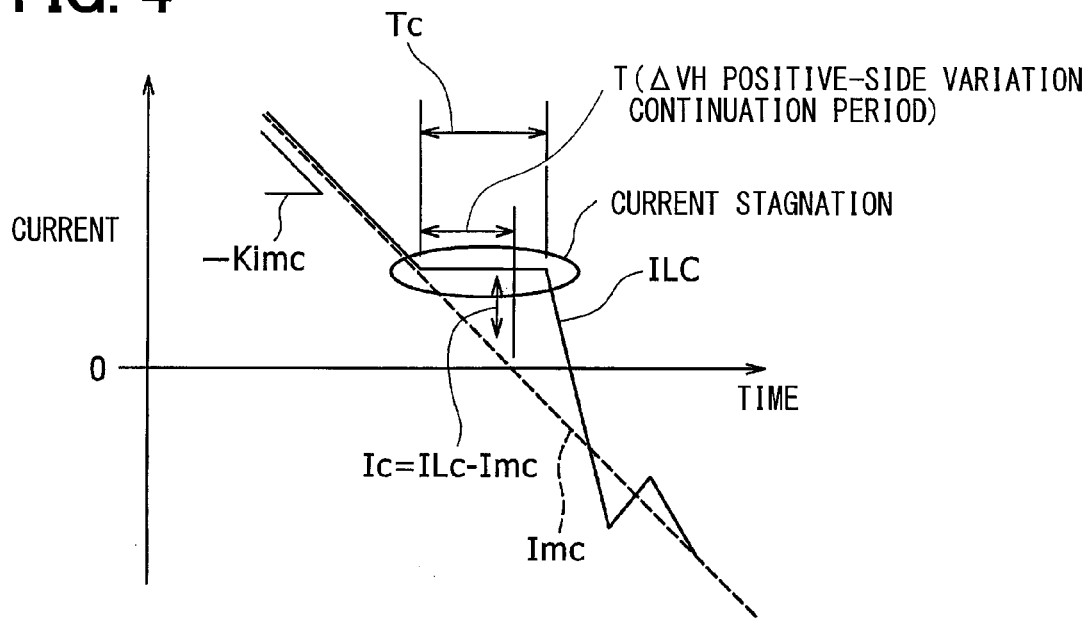
FIG. 4 is a time chart showing time variations of a high-side arm current ILc and a motor consumption current Imc at the time of generation of current stagnation.

When the motor consumption current Imc decreases from the positive side as shown by a dotted line in FIG. 4 at the time of change from the power running operation to the regeneration operation, the reactor current IL also decreases and remains in a fixed range around zero for a short time. Thus the current stagnation arises. In this case, the high-side arm current ILc shown by a solid line in FIG. 4 also stagnates around zero. The capacitor current Ic during the current stagnation is expressed as the following equation (2), in which Tc indicates a current stagnation continuation period. Here, −Kimc (A/s) indicates an inclination of variation of the motor consumption current Imc relative to time near zero current.

$$Ic = Kmic \times Tc \quad (2)$$

At the time of current stagnation, the capacitor current Ic flows into the high voltage-side capacitor 28 and the system voltage VH increases as electric charge is stored. The system voltage VH increases from the start of the current stagnation. This increase continues until the motor consumption current Imc becomes zero. In this case, the variation amount of the system voltage VH varies at the positive side, that is, at the side of increase. As a result, the VH change amount ΔV1 is expressed as the following equation (3), in which T indicates a voltage positive-side variation continuation period, which is the stagnation continuation period of the reactor current IL. Here, Cm indicates a capacitance of the high voltage-side capacitor 28.

$$\Delta V1 = (1/Cm) \times \int (Ic) dt = 1/Cm \times \frac{1}{2} \times Kmic \times T^2 \quad (3)$$

It is understood from the equation (3) that the variation amount ΔV1 of the system voltage VH at the time of current stagnation is determined in correspondence to the square of the voltage positive-side variation continuation period, that is, in a relation of a quadratic function. As a result, the magnitude of the difference ΔVH, which is determined by subtracting the voltage command value VH* from the sensor output value VH of the system voltage also is determined in correspondence to the square of a positive-side variation continuation period T.

According to the first embodiment, for this reason, the control apparatus 22 determines the positive-side variation continuation period T of the difference ΔVHLP, which is based on the voltage difference ΔVH and filter-processed, and corrects the duty ratio by correcting the integral term by using the quadratic function of continuation period T. In this case, the correction value for the integral term is determined as Kadj×T² by using a constant Kadj, which is derived in advance from the quadratic function of the equation (3). By using the filter processing, the surge voltage is suppressed in a short time. This surge suppression will be described later.

Referring to FIG. 2, the integral term correction part 50 includes the VH waveform filter processing part 56, the continuation period calculation part 58 and the integral term correction value calculation part 60. This correction part 50 has a control function of preventing generation of the current stagnation and rapid variation of current. The correction part 50 is thus referred to as an IL current control part. The VH waveform filter processing part 56 performs low-pass filter processing on a waveform of time change of the voltage difference ΔVH, which is shown in the upper part in FIG. 5, and calculates a filter-processed voltage difference ΔVHLPF. The voltage difference ΔVHLPF is the VH-related voltage, which is related to the system voltage VH. The waveform of the time variation of the voltage difference ΔVHLP gradually increases in the positive side while fluctuating up and down at the time of current stagnation of the reactor current IL and is larger than zero even at the bottom P1 of the waveform.

The generation of the current stagnation may be detected by detection of the P1 state. The waveforms of ΔVH and ΔVHFLPF are superimposition of waveforms of the voltage variation in the quadratic function of T at the time of surge voltage generation of current stagnation on waveforms of voltage variations in the sine waveform of electrical variation of first order. The voltage variation in the sine waveform is caused because the consumption current and the consumption power of the MG 14 are varied because of detection error of the current sensor 30. The low-pass filter processing is performed so that sine waveform components in the electrical variation of first order, which is at the higher frequency side than the waveform of the voltage variation in the quadratic function of T, from the waveform of the voltage difference ΔVH.

The continuation period calculation part 58 shown in FIG. 2 calculates, in each control cycle, the continuation period T of the positive-side voltage difference relative to zero, which is a reference voltage corresponding to the voltage command VH* for the system voltage, in the waveform of the voltage difference ΔVH. For example, assuming that each control cycle is Ta1, Ta2, - - -, in FIG. 5, the continuation period T is calculated as T1, T2 at each control cycle Ta1, Ta2. In the control cycle Ta4, the voltage difference ΔVHLPF becomes equal to or smaller than zero and the continuation period T is reset to zero. In the N-th control cycle TaN, it is positive even at the bottom P1 of the voltage difference ΔVHLPF. Thus the calculation value of the continuation period T becomes a large value with the addition of the existing continuation period. Since the difference ΔVHLPF, which is the difference VH between the voltage command VH* and the sensor output value of the voltage sensor 20 and filter-processed, is used as the voltage difference, the reference voltage is zero. In a case that a difference waveform is determined while maintaining absolute values of the voltage command VH* and the sensor output value, the voltage command VH* itself may be set as the reference voltage.

The integral term correction value calculation part 60 calculates the integral term correction value $Kadj \times T^2$ from the continuation period T by using a constant Kadj in each control cycle. When the voltage difference ΔVHLPF becomes equal to or less than zero in each control cycle, the integral term correction value becomes zero because T is zero. The calculation value of the integral term correction value $Kadj \times T^2$ is outputted to an adder 54 to be added to the outputs of the integral multiplier 48 and the one-shift delay circuit 55 by the adder 54.

Figure 6A:
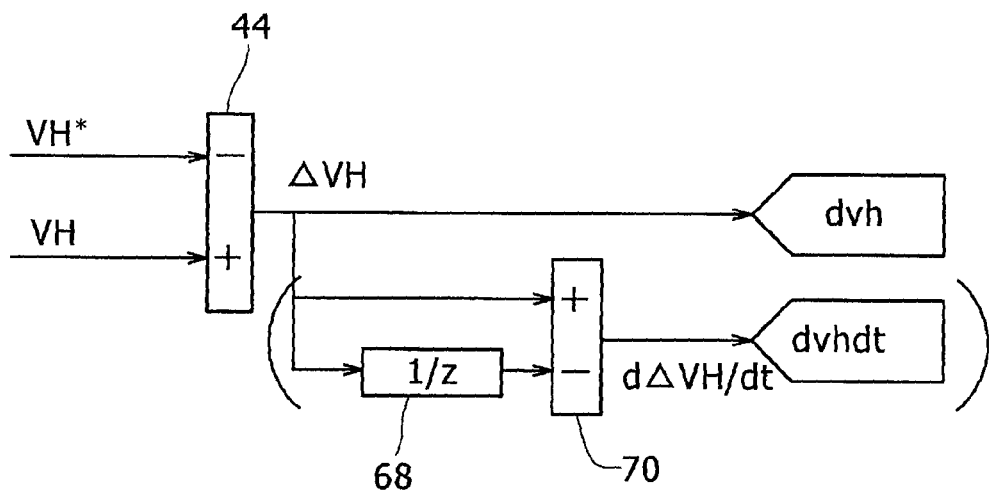
FIG. 6A and FIG. 6B are block diagrams showing a first step of control processing at the time of duty ratio correction in the first embodiment.
Figure 6B:
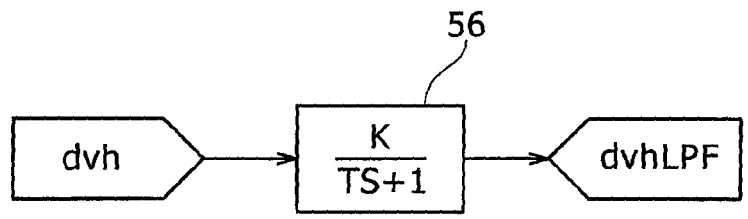

The method of calculation of the integral term correction value $Kadj \times T^2$ in accordance with the voltage command VH* and the detection voltage VH will be described below with reference to a flowchart by referring to FIG. 6A to FIG. 8. In FIG. 6A, the subtractor 44 calculates a difference dvh between the sensor voltage VH and the voltage command value VH* of the system in each control cycle. In FIG. 6(b), the VH waveform filter processing part 56 filter processes the calculation value dvh and calculates as dvhLPF.

Figure 7A:
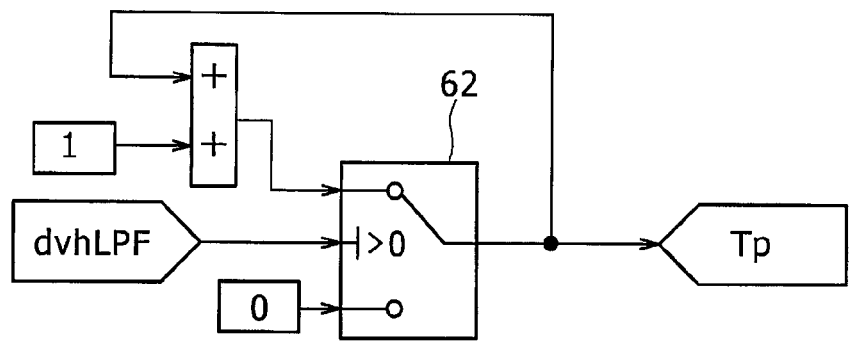
FIG. 7A, FIG. 7B and FIG. 7C are block diagrams showing a second step of control processing at the time of the duty ratio correction in the first embodiment.
Figure 7B:
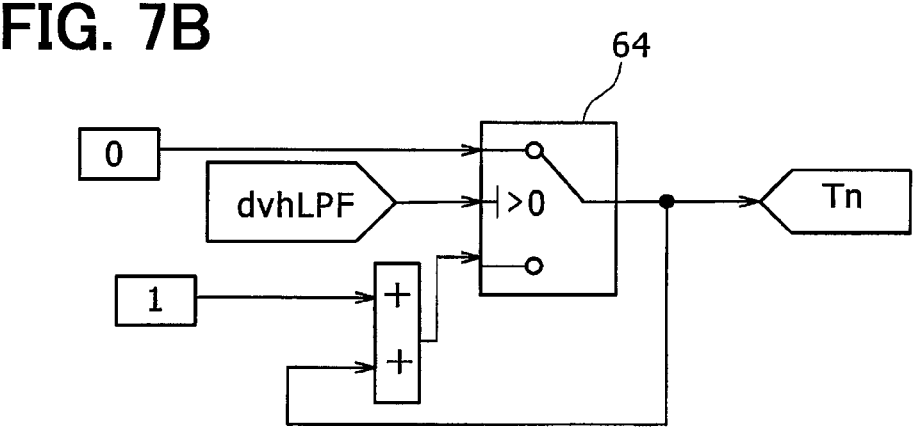

In FIG. 7A, a switch 62 provided in the continuation period calculation part 58 checks whether the calculation value dvhLPF is positive or negative. If the calculation value dvhLPF is positive, 1 is added to a continuation period Tp, which is calculated in the preceding control cycle, in each control cycle to be outputted as the continuation period Tp of the present control cycle. If the calculation value dvhLPF is negative, zero is inputted to the continuation period Tp so that the continuation period Tp is reset to zero. In FIG. 7A, the continuation period, in which the calculation value dvhLPF of the filter-processed voltage difference changes to be positive, is indicated as Tp. In FIG. 7B, the continuation time, in which the calculation value dvhLPF changes to be negative, is indicated as Tn. The correction value is not calculated by addition of integral term using the negative-side continuation period Tn. In a case that the surge voltage of the system voltage VH becomes larger in the negative side when the MG 14 changes its operation from the regeneration operation to the power running operation. In this case, therefore, the integral term correction value is calculated by using the negative-side continuation period Tn.

In FIG. 7B, a switch 64 provided in the continuation period calculation part 58 checks whether the calculation value dvhLPF is positive or negative. If the calculation value dvhLPF is positive, zero (0) is inputted to the continuation period Tn. If the switch 64 determines that the calculation value dvhLPF is negative, 1 is added to the continuation period Tn, which is calculated in the preceding control cycle, in each control cycle to be outputted as the continuation period Tn of the present control cycle.

Figure 5:
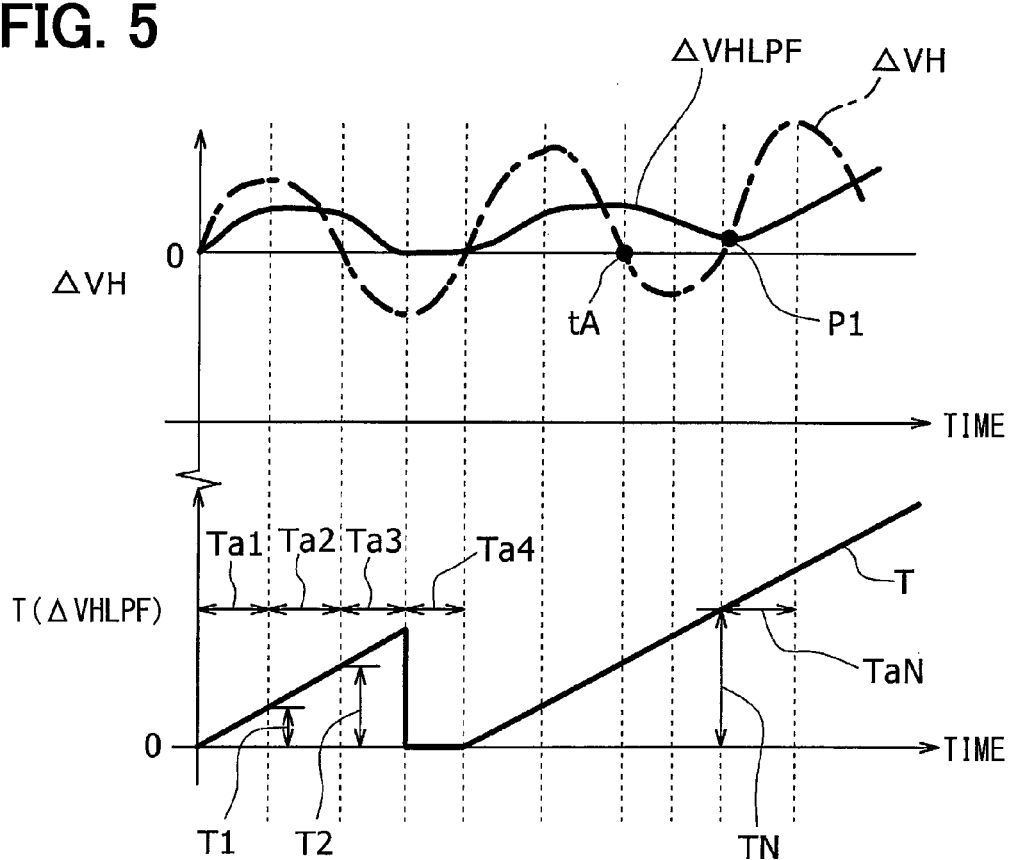
FIG. 5 is a time chart showing time variations of a voltage difference ΔVHLP of a system voltage after processing by a low-pass filter and its positive-side variation continuation period T.
Figure 7C:
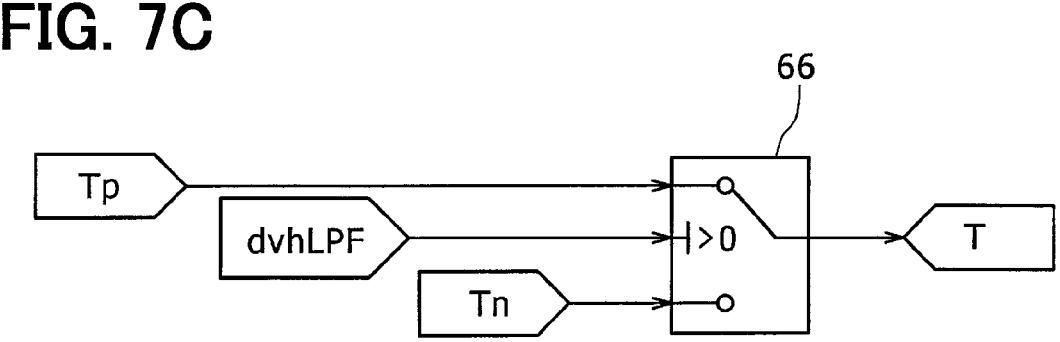

In FIG. 7C, a switch 66 provided in the continuation period calculation part 58 checks whether the calculation value dvhLPF is positive or negative. If the calculation value dvhLPF is positive, the continuation period Tp is outputted as the continuation period T. If the switch 66 determines that the calculation value dvhLPF is negative, the continuation period Tn is outputted as the continuation period T. By the processing of FIGS. 7A, 7B and 7C, only the continuation period, in which the filtered voltage difference ΔVHLPF in FIG. 5 is positive, is added in each control cycle until being reset. In this case, an addition value of the continuation period per one control cycle is 1. The above-described control is performed in all of the control cycles. As a result, the continuation period T is calculated in all the control cycles including the predetermined time points of current stagnation, at which the reactor current IL stagnates immediately before and immediately after switching between the boost operation and the buck operation.

Figure 8:
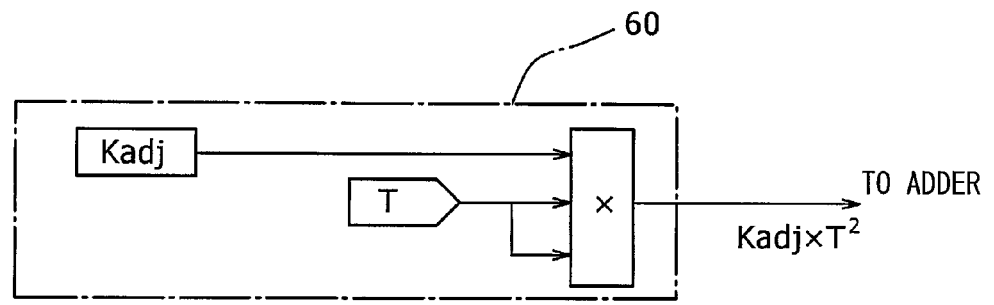
FIG. 8 is a block diagram showing a third step of control processing at the time of the duty ratio correction in the first embodiment.

In FIG. 8, the integral term correction value calculation part 60 multiplies the continuation period T outputted in FIG. 7C by the constant Kadj and outputs a multiplication result, that is, the integral term correction value $Kadj \times T^2$, to the adder 54 shown in FIG. 2.

In the adder 54, the integral term correction value $Kadj \times T^2$ is added to the outputs of the integral multiplier 48 and the one-shift delay circuit 55 to be outputted to the adder 52. In the adder 52, the outputs of the proportional multiplier 46 and the adder 54 are added to the output of the VH/VL* calculation part 35 so that the duty ratio Du* is corrected and outputted. The signal indicating the threshold value calculated from the corrected duty ratio Du* is compared with the carrier signal CR of a predetermined triangular waveform inputted from the carrier signal generation part 40 in the drive signal generation part 38. A drive signal Pw, which changes its logical signal state between 0 and 1 in correspondence to the comparison result, is thus generated. The drive signal Pw is inputted to the boost-buck converter 12. The switching elements of the boost-buck converter 12 are controlled in accordance with the drive signal Pw to perform a predetermined boosting (step-up) operation or bucking (step-down) operation. When the logic state of the drive signal Pw indicates that the duty ratio Du* is larger than the carrier signal CR, the switching element S1 of the high-side arm A1 is turned on and the switching element S2 of the low-side arm A2 is turned off. When the logic state of the drive signal Pw indicates that the duty ratio Du* is smaller than the carrier signal CR, the switching element S1 of the high-side arm A1 is turned off and the switching element S2 of the low-side arm A2 is turned on. Thus the boosting operation and the bucking operation are performed in cases of the power running operation and the regeneration operation of the MG 14, respectively.

According to the control system 10 configured as described above, the duty ratio Du* is corrected by using the quadratic function of the continuation period T in each control cycle, in which the waveform of ΔVHLPF of the filter-processed voltage difference ΔVH continues to be in the positive side, that is, the same polarity side. The continuation period T increases as the variation of ΔVHLPF in the positive side continues longer. Further, the continuation of ΔVHLPF in the positive side becomes longer as the rapid change of the system voltage VH in the positive side increases. For this reason, differently from a case that the duty ratio Du* is corrected with a predetermined value, the rapid variation in the system voltage as well as the rapid variations in the current and the voltage of the battery 16 can be suppressed by using the appropriate correction values at the time of generation of current stagnation. At this time, influence of manufacturing errors of various voltage sensors 18, 10 and circuit component parts including the switching elements S1, S2 is suppressed. Thus, degradation of life of parts caused by excessive voltages of the system voltage VH and the battery 16 can also be suppressed. The stagnation of the reactor current IL around zero can be suppressed. Since a current sensor, which detects the reactor current IL, need not be provided newly for detecting the stagnation of current, manufacturing cost can be reduced.

Further, since the duty ratio Du* is corrected by using the waveform of the filter-processed voltage difference ΔVHLPF, the calculation value of the continuation period TN, in which generation of the current stagnation continues, can be increased at early time as shown in FIG. 5. For this reason, even if the constant Kadj of the integral term correction value Kadj×T² used in the duty ratio correction is decreased, the integral term can be increased at early time so that the surge voltage may be diminished at early time.

In a configuration, in which the continuation period T is calculated based on the waveform of the voltage difference ΔVH, which is not filter-processed as in a second embodiment shown in FIG. 10 and described later, the voltage difference LAM becomes equal to or lower than zero at time tA, which is before the bottom part P1 shown in FIG. 5 and the calculation value of the continuation period T calculated up to that time is reset. In this case, in a case that the constant Kadj is decreased, it is not possible to increase the integral term correction value at early time at the time of generation of the current stagnation. According to the first embodiment, however, the integral term correction value can be increased at early stage even if the constant Kadj is decreased. As a result, when no current stagnation is generated, the system voltage VH is prevented from becoming unstable because of the excessive correction to the integral term by restricting the integral term correction value Kadj×T² from increasing excessively. The waveforms of ΔVHLPF and ΔVH shown in FIG. 5 include a variation component of a sine waveform due to detection error of the current sensors 30. However, the variation component of the sine waveform can be decreased by setting the integral gain Ki to be large in the PI control. In this case, the voltage variation in the quadratic function at the time of current stagnation can be diminished at early time.

Figure 9:
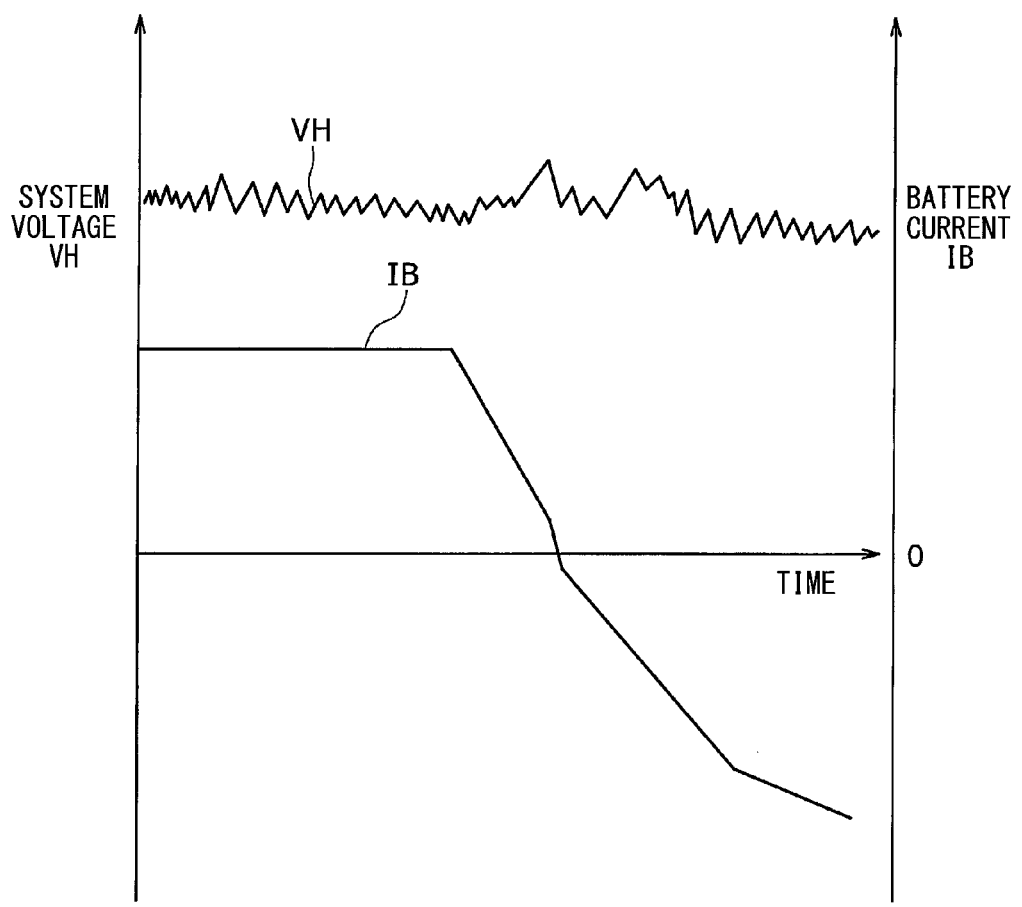
FIG. 9 is a time chart showing a result of experiment of time variations of a system voltage VH and a battery current IB in the first embodiment.

FIG. 9 shows a result of experiment of time variations of the system voltage VH and the battery current IB in the first embodiment. As understood from comparison of FIG. 9 with FIG. 3, which shows the comparison example, the first embodiment can suppress the rapid variation of the system voltage VH and prevents the stagnation of the battery current IB around 0 as well as the rapid variation of the battery current IB.

It is noted that, as shown in FIG. 6, the voltage difference dΔVH/dt may be calculated as dvhdt as a time variation rate of the voltage difference by a subtractor 70 by inputting to the subtractor 70 an output of the subtractor 44 and the output of the subtractor 44 after passing through the one-shift delay circuit 68. This calculation value dvhdt may be used to determine the calculation start of the continuation period T. For example, it is determined that the generation of current stagnation started when the voltage difference dvh is positive under a state that dvhdt is negative in the preceding control cycle and dvhdt is positive in the present control cycle. The current stagnation time is determined to end when the voltage difference dvh becomes equal to or lower than zero in each control cycle after the start of the current stagnation generation. The integral term correction value calculation part 60 shown in FIG. 8 multiplies the continuation period T by the constant Kadj in only the control cycles of the predetermined time and outputs the multiplication result to the adder 54. In this case, the predetermined time indicates time of generation of the current stagnation, in which the reactor current IL stagnates generally within a constant range immediately before or after the switchover between the boosting operation and bucking operation of the boost-buck converter 12.

In a case that the duty ratio Du* is corrected in only such a predetermined time, the voltage difference ΔVHLPF can be diminished only after the point P1 in FIG. 5. For this reason, even if the constant Kadj for the integral term correction value Kadj×T² in the PI control is increased to diminish the voltage change at the time of current stagnation generation time at earlier time, the system voltage VH can be stabilized more without excessively correcting the integral term under a condition that the current stagnation is not present.

Since the current stagnation is generated due to the dead time of the switching element of the boost converter, it is assumed as one comparison example that the duty ratio is corrected by predicting the dead time. The dead time, however, varies with manufacturing errors of the switching element. It is therefore likely that the duty ratio cannot be corrected with the appropriate correction value. It is also assumed as another comparison example that the duty ratio at the time of current stagnation is corrected by comparison of the sensor output value itself of the current sensor or the voltage sensor with a predetermined value. However, in this case, it is likely that the duty ratio cannot be corrected with the appropriate correction value because the controllability is lowered due to the manufacturing error of the sensor, which causes the sensor error such as an offset error or a gain error. According to the first embodiment, differently from a case, in which the duty ratio is corrected with a predetermined value, influence of external disturbance such as manufacturing error of the component parts can be suppressed. As a result, robust control can be realized without disadvantages of the comparison examples.

Second Embodiment

Figure 10:
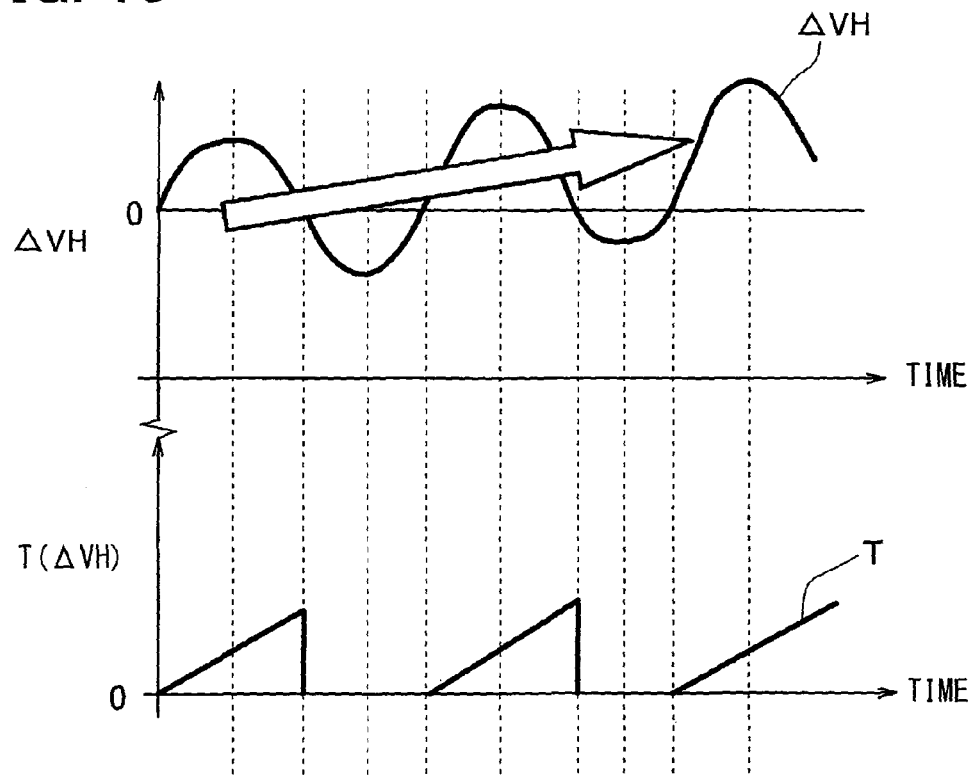
FIG. 10 is a time chart showing time variations of a voltage difference ΔVH of a system voltage and its positive-side variation continuation period T according to a second embodiment.

FIG. 10 shows time variations of the voltage difference ΔVH of the system voltage and its positive-side variation continuation period T in a second embodiment. The continuation period calculation part 58 of the control apparatus 22 calculates the positive-side variation continuation period T, in which the voltage difference ΔVH of ΔVH waveform continues in the positive side. In this case, the waveform of the voltage difference ΔVH is not filter-processed and the continuation period T is calculated in each control cycle, in which the waveform of the voltage difference ΔVH continues to be in the same polarity side. The calculated continuation period T is inputted to the integral term correction value calculation part 60 and added to the outputs of the integral multiplier 48 and the one-shift delay circuit 55 by the adder 54. It is thus possible to calculate the continuation period T based on the waveform of the voltage difference ΔVH, which is not filter-processed, and correct the duty ratio Du* by using such a calculated value. In this case, the VH-related voltage is the voltage difference ΔVH. According to this configuration as well, it is possible to suppress the rapid variation of the system voltage VH by using the appropriate correction value at the time of generation of the current stagnation while suppressing the influence of manufacturing error of component parts. Other configuration and operation are the same as the first embodiment.

Third Embodiment

Figure 11:
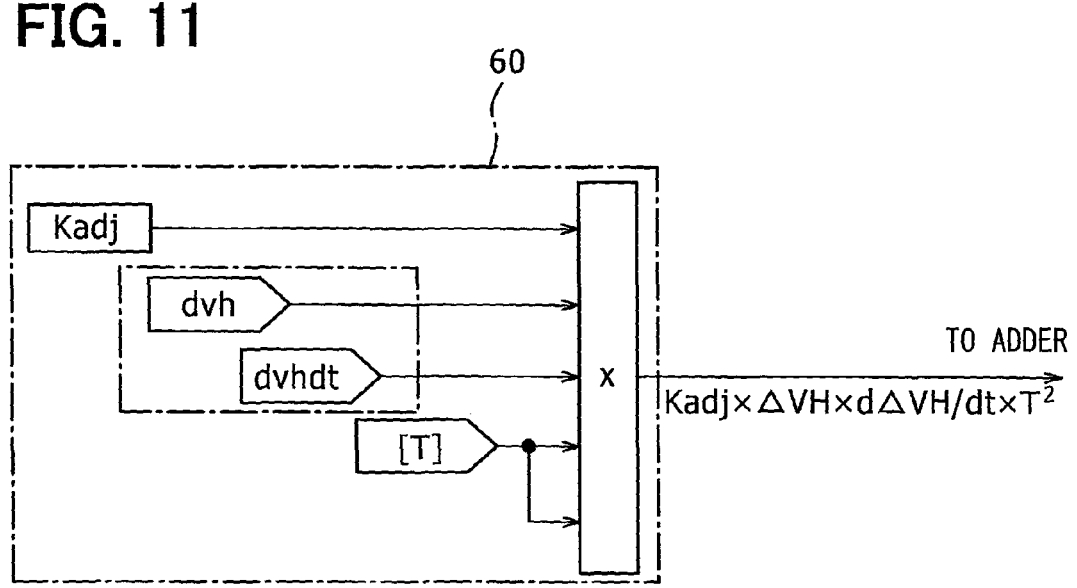
FIG. 11 is a block diagram showing a third step of control processing at the time of duty ratio correction in a third embodiment.

FIG. 11, which corresponds to FIG. 8, shows in a block diagram a third step of the control processing performed at the time of duty ratio correction. The integral term correction value is calculated by multiplying the square of the continuation period T by the constant Kadj and the voltage differences dvh and dvhdt. The multiplication result Kadj×dvh×dvhdt×$T^2$ is outputted to the adder 54. dvhdt is a time variation rate of the voltage difference ΔVH. According to the third embodiment, the voltage difference dvhdt per one control cycle, which is calculated by using the one-shift delay circuit 68 and the subtractor 70 shown in FIG. 6A is used as the time-variation rate. In this case, as the processing shown in FIG. 11, a first step can be performed by multiplying the voltage difference dvh and the voltage difference dvhdt per one control cycle. After the first step, a second step is performed by setting the multiplication result as a voltage waveform characteristic value Kvs. At the second step, the voltage waveform characteristic value Kvs is multiplied by Kadj×$T^2$, which is an integral term correction coefficient, and the multiplication result Kadj×Kvs×$T^2$ is outputted to the adder 54 as the integral term correction value.

According to this configuration, the integral term of the PI control is not corrected excessively in the case of no generation of the current stagnation, and the duty ratio Du* and the system voltage VH are suppressed from becoming unstable for the following reason. If the integral term of the PI control is set to be excessively large in a case of absence of the current stagnation, the system voltage VH becomes unstable. Since the correction value including $T^2$ is added to the integral term, the integral term is likely to become excessively large if the correction value is added at the time of absence of the current stagnation, where it is not necessary to correct with the quadratic function of T.

Figure 12:
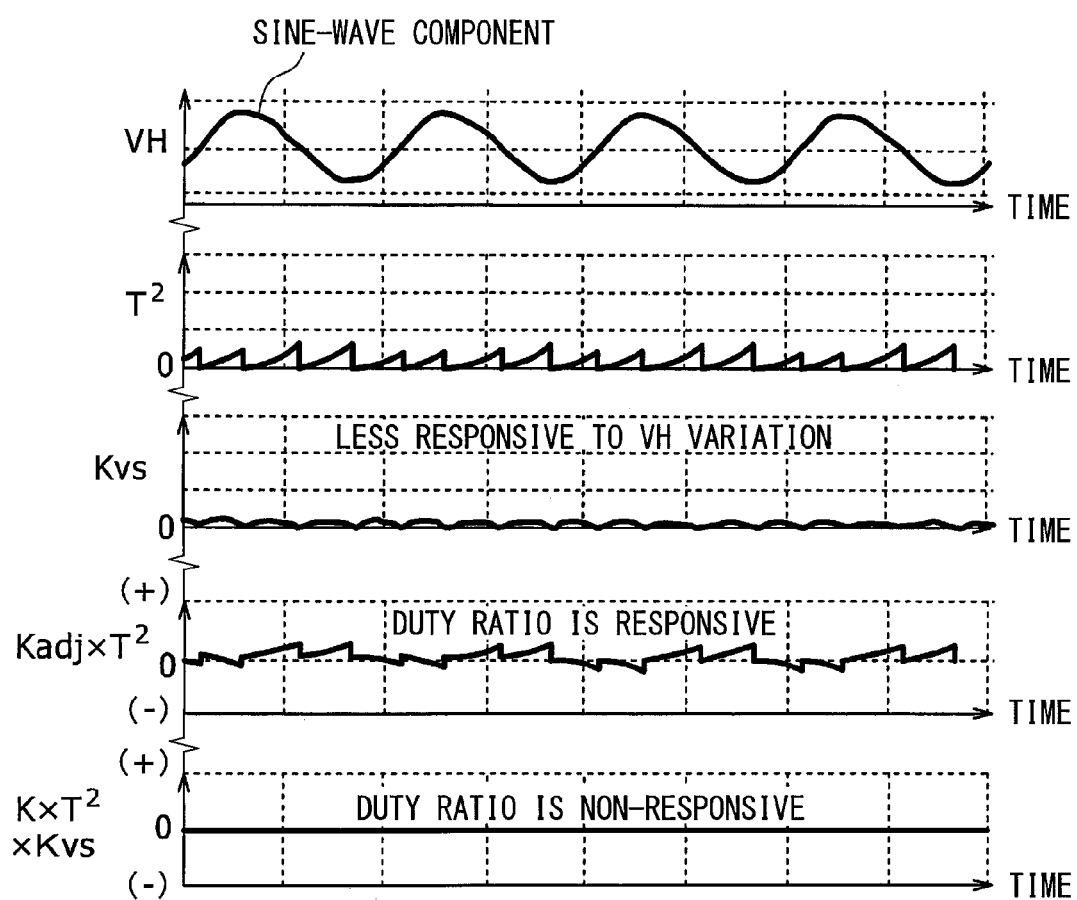
FIG. 12 is a time chart showing a result of a waveform of a sine wave component extracted from a waveform of a system voltage VH in the third embodiment and experimental results of various values calculated based on the extracted waveform.
Figure 13:
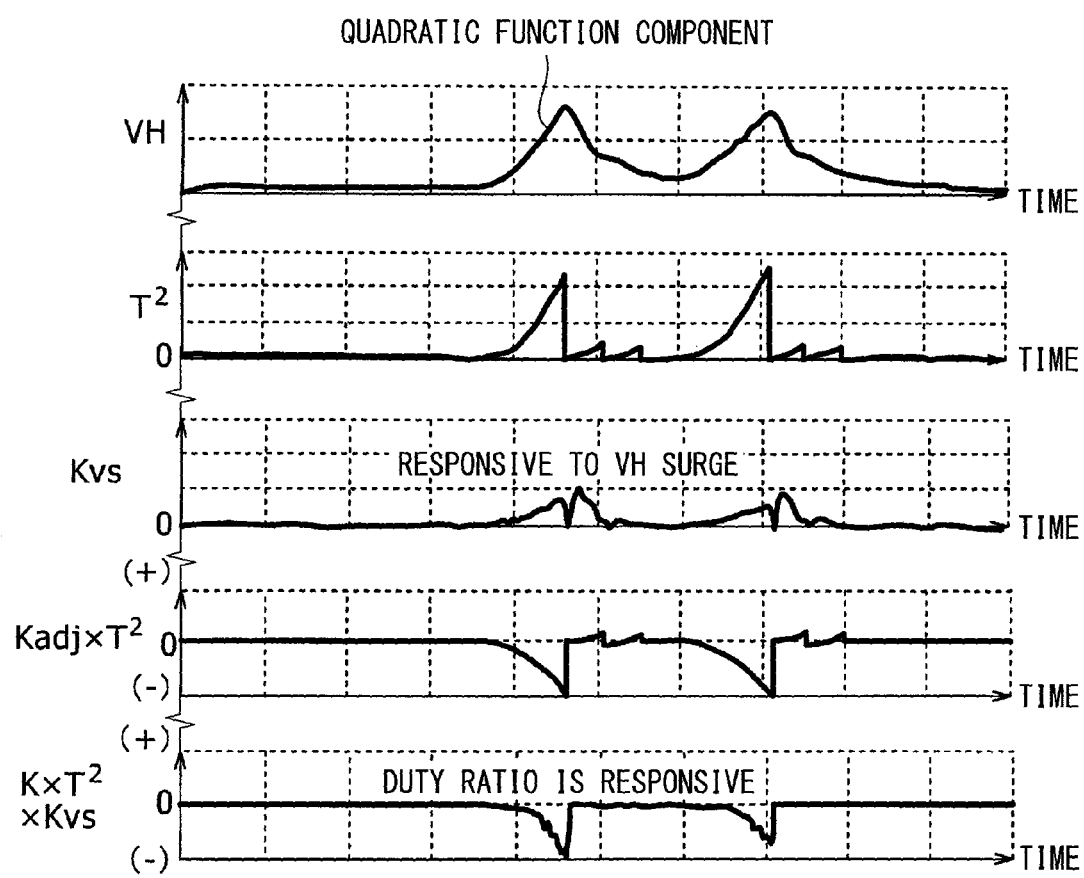
FIG. 13 is a time chart showing a result of a waveform of a secondary function component of T extracted from a waveform of a system voltage VH at the time of generation of current stagnation in the third embodiment and experimental results of various values calculated based on the extracted waveform.

FIG. 12 shows experimental results of a waveform indicating a sine wave component extracted from the waveform of the system voltage VH, $T^2$ indicating a various value based on the extracted waveform, the voltage waveform characteristic value Kvs, the integral term correction value Kadj×$T^2$ and the integral term correction value Kadj×$T^2$×Kvs. FIG. 13 shows experimental results of a waveform indicating a quadratic function component extracted from the waveform of the system voltage VH at the time of generation of the current stagnation, $T^2$ based on the extracted waveform, Kvs, Kadj×$T^2$ and Kadj×$T^2$×Kvs. In FIG. 12 and FIG. 13, $T^2$ is calculated with respect to not only the continuation period, in which the voltage difference ΔVH changes in the positive side, but also the continuation period, in which the voltage difference changes in the negative side, while being reset each time the voltage difference ΔVH changes between the positive side and the negative side. In FIG. 12 and FIG. 13, the voltage waveform characteristic value Kvs is shown as an absolute value.

As shown in FIG. 12, with respect to the sine wave component of the voltage difference ΔVH, the integral term correction coefficient Kadj×$T^2$ is influenced largely by the continuation period and varies largely. For this reason, if the integral term correction coefficient Kadj×$T^2$ is set as the integral term correction value, the duty ratio Du* is largely affected and varied responsively.

On the contrary, the absolute value of the voltage waveform characteristic value Kvs is not influenced largely by the variation of the voltage difference ΔVH and hence not varied largely either. This is because the voltage waveform characteristic value Kvs is dvh×dvhdt and the slope of the sine wave component of the voltage difference ΔVH relative to time decreases as the absolute value increases. As a result, even if dvh increases, dvhdt decreases and is thus cancelled. According to the third embodiment, the integral correction value is set as Kadj×$T^2$×Kvs and not affected largely by variation of the sine wave component of the voltage difference ΔVH. The duty ratio Du* is not affected responsively.

However, if the integral term correction coefficient Kadj×$T^2$ is set as the integral term correction value with respect to the quadratic function component of the continuation period T of the voltage difference ΔVH at the time of generation of the current stagnation, the duty ratio Du* is affected largely and varied responsively. The absolute value of the voltage waveform characteristic value Kvs is affected largely as well by the variation of the voltage difference ΔVH at the time of generation of the current stagnation and is varied largely. This is because the voltage waveform characteristic value Kvs is dvh×dvhdt and the slope of the quadratic function component of the voltage difference ΔVH relative to time increases as the absolute value increases. As a result, both dvh and dvhdt increase. According to the third embodiment, in which the integral term correction value is set as Kadj×$T^2$×Kvs, the duty ratio Du* is affected responsively by the variation of the quadratic function component of the voltage difference ΔVH. For this reason, the voltage waveform characteristic value Kvs is used to distinguish the surge voltage generated by the current stagnation and the voltage variation caused by power consumption of the MG 14, which is the load. For the reason described above, the integral term of the PI control is restricted from being corrected excessively in the case of no generation of the current stagnation. Further, the duty ratio Du* and the system voltage VH are suppressed from becoming unstable.

Figure 14:
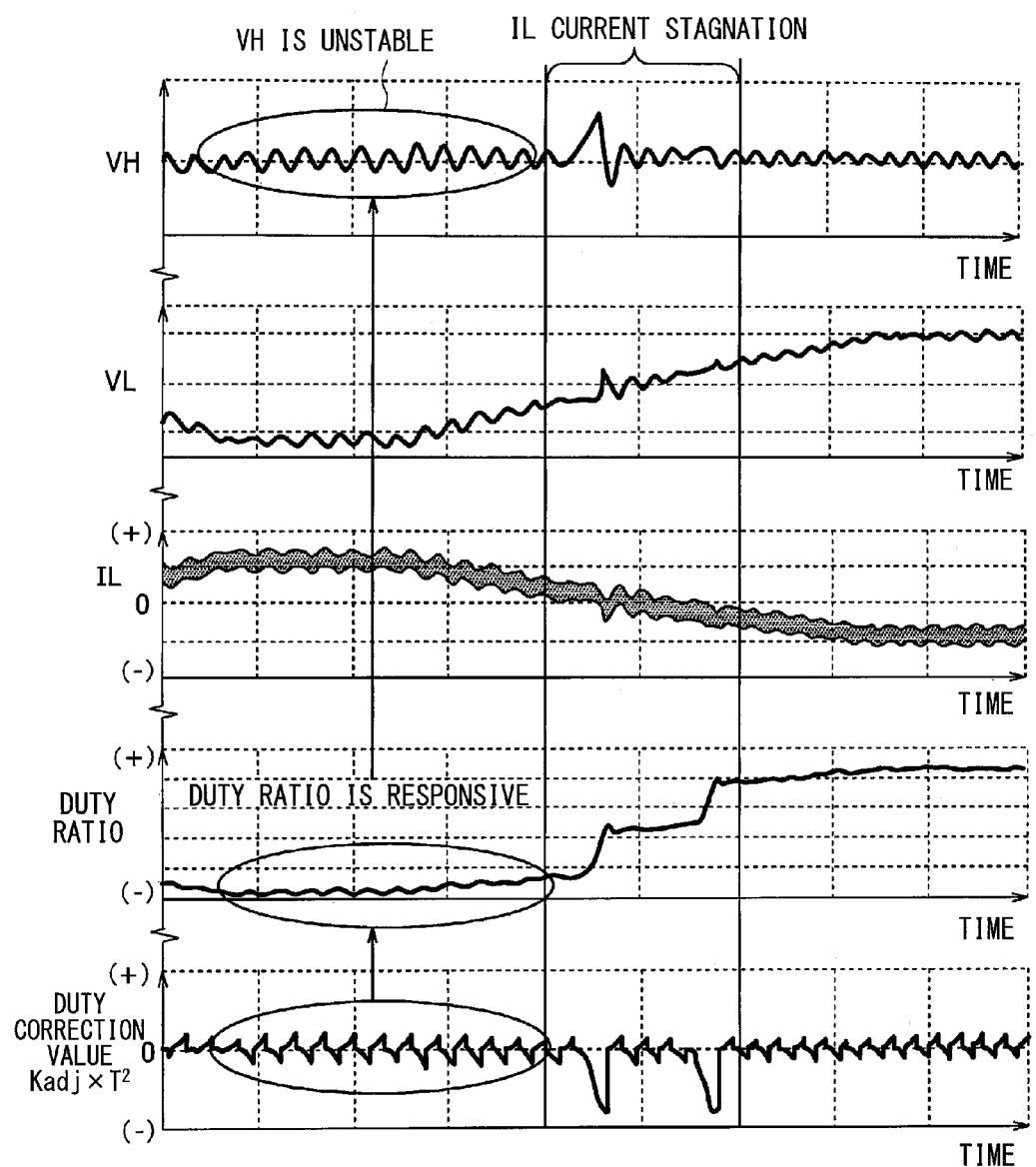
FIG. 14 is a time chart showing a result of experiment of time variations of a system voltage, a battery voltage VL, a reactor current IL, a duty ratio Du* and a duty correction value.

FIG. 14 and FIG. 15 show experiment results of time variations of the system voltage VH, the battery voltage VL, the reactor current IL, the duty ratio Du* and the duty correction value in the second embodiment and the third embodiment, respectively. In FIG. 14 and FIG. 15, a dotted area showing variation of the reactor current IL indicates that ripples, by which the reactor current IL changes largely, are generated. The duty ratio correction value indicates a rate (%) of the correction value used by the duty ratio correction part 36 in the duty ratio acquired from the calculation value of the VL/VL* calculation part 35.

In the second embodiment shown in FIG. 14, Kadj×T² is used as the integral term correction value. As a result, the duty ratio correction value varies largely in an area, which is not the current stagnation area of IL and hence the duty ratio Du* also changes largely. Thus the system voltage VH changes largely and becomes unstable. According to the third embodiment shown in FIG. 15, kadj×T²×Kvs, which includes the voltage waveform characteristic value Kvs, is used as the integral term correction value. As a result, in the area other than the current stagnation area of IL, variation of the duty ratio correction value is reduced and hence the variation of the duty ratio Du* is also reduced. Thus, it is confirmed that the system voltage VH is changed less and stabilized. Other configuration and operation are the same as in the first embodiment.

The third embodiment shown in FIG. 11 is described assuming that the integral term correction value is set to Kadj×T²×Kvs. However, since the continuation period T increases when ΔVH is positive, the integral term correction value may be set to Kadj×dΔdVH/dt×T or Kadj×ΔVH×dΔVH/dt×T. Further, in the third embodiment, the start of calculation of the continuation period T shown in FIG. 11 may be determined based on dvhdt in the similar manner as in the first embodiment.

In each embodiment described above, variation of the system voltage, which is caused by the current stagnation generated when the motor changes its operation from the power running operation to the regenerative operation, is suppressed. It is also possible to implement the above-described embodiments to suppress the variation of the system voltage, which is caused by the current stagnation generated when the motor changes its operation from the regenerative operation to the power running operation. In this case, the voltage surge becomes larger in the negative direction. For this reason, the current stagnation continuation period T is calculated based on the period, in which the voltage difference ΔVH or the filter-processed voltage difference ΔVHLPF continues to be in the same polarity, that is, in the negative side, in FIG. 5.

The boost-buck converter control system described above is not limited to the above-described embodiments but may be implemented as various different embodiments.

What is claimed is:

1. A boost-buck converter control system comprising:
   a boost-buck converter provided between a charge storage device and a load and including a plurality of switching elements and a reactor, the boost-buck converter boosting or bucking a voltage between a voltage of the charge storing device and a system voltage of the load; and
   a control apparatus for controlling an operation of the boost-buck converter;
   a voltage sensor for outputting a sensor output value indicative of the system voltage,
   wherein the control apparatus calculates a continuation period, in which a voltage difference relative to a reference voltage corresponding to a voltage command of the system voltage continues to be in a same polarity side in a system voltage-related voltage, and corrects a duty ratio of the boost-buck converter in accordance with a calculation value of the continuation period, the continuation period including a predetermined time, in which generation of current stagnation is determined based on the sensor output value of the system voltage, the current stagnation indicating stagnation of a reactor current at immediately before or after a switchover between a boost operation and a buck operation of the boost-buck converter.

2. The boost-buck converter control system according to claim 1, wherein:
   the control apparatus calculates a voltage waveform characteristic value, which distinguishes a surge voltage generated by the current stagnation and a voltage variation of a power consumption of the load based on a difference of waveforms and is a product of a time-variation rate of the voltage difference and the voltage difference; and
   the control apparatus corrects the duty ratio based on the voltage waveform characteristic value.

3. The boost-buck converter control system according to claim 1, wherein:
   the control apparatus corrects the duty ratio of the boost-buck converter by using a square value of the continuation period.

4. The boost-buck converter control system according to claim 2, wherein:
   the control apparatus calculates the continuation period by filter-processing the voltage difference of the system voltage and using a filter-processed voltage difference.

5. The boost-buck converter control system according to claim 1, wherein:
   the control apparatus calculates the continuation period by filter-processing the voltage difference of the system voltage and using a filter-processed voltage difference.

6. The boost-buck converter control system according to claim 5, wherein:
   the control apparatus corrects the duty ratio of the boost-buck converter by using a proportional term value and an integral term value of the voltage difference of the system voltage; and
   the control apparatus corrects the integral term value of the voltage difference by using the continuation period calculated based on the filter-processed voltage difference.

* * * * *